Patented July 10, 1951

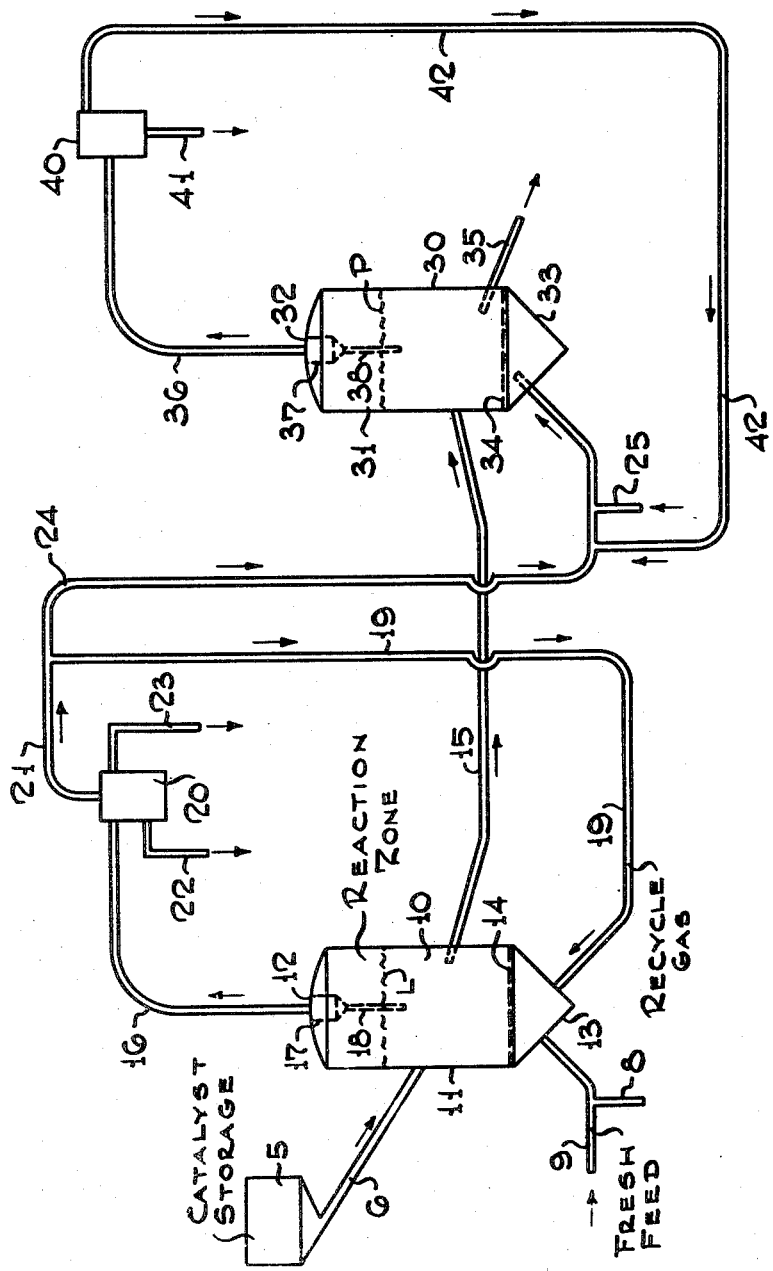

2,560,344

UNITED STATES PATENT OFFICE 2,560,344

TWO STAGE HYDROCARBON SYNTHESIS OPERATION

Charles E. Hemminger, Westfield, N. J., assignor to Standard Oil Development Company, a corporation of Delaware Application September 29, 1947, Serial No. 776,752

3 Claims. (Cl. 260—449.6)

This invention relates to the hydrogenation of the oxides of carbon and in particular, to two-stage processing involving first, the formation of oxygenated hydrocarbons and secondly, the formation of hydrocarbons suitable for use as motor fuels.

The contacting under various temperatures and pressures of the oxides of carbon, particularly carbon monoxide, with hydrogen in the presence of catalyst is the means by which a variety of hydrocarbon and oxygenated hydrocarbon compounds may be prepared. The temperatures and pressures employed in the processing vary widely and depend upon factors such as the type of catalyst, the nature of the feed, and final products desired. The catalyst employed usually consists of a large percentage of either iron, cobalt, or nickel with minor amounts of activating substances such as alumina and potassium. In order to obtain high efficiencies, particular reaction conditions, limited stage operations, and recycling features are commonly employed.

The present invention is an improvement over prior art processing in the high order of utilization of catalyst masses and prevention of this deterioration by controlling the character and volume of the feed stock. Within the scope of the invention is the prevention of the formation of carbon deposits on the catalyst by using a relatively high percentage of water in synthesis operations for the preparation of oxygenated organic compounds. Another feature of the invention is the particular control of operating conditions in the synthesis of the oxygenated compounds so that less than 80% of the mixture of hydrogen and carbon monoxide is reacted to form the oxygenated organic compounds and the subsequent use is made of the catalyst from such processing and of the unreacted feed stock for the preparation of hydrocarbons particularly desirous as motor fuel. Other advances over prior art processing will be seen from the more detailed description and illustration of the invention.

By the two-stage processing of the invention oxygenated hydrocarbons are advantageously prepared by adding from 2% to 8% and preferably 3% to 5% water to the feed to a first reaction zone in which iron base catalyst contains from about 1% to 8% of alkali compound, particularly potassium and preferably either potassium carbonate or potassium fluoride, as a promoter. The catalyst is preferably sintered or pretreated with carbon monoxide or a mixture of carbon monoxide and hydrogen to contain from 1 to 3% carbon as carbide carbon. The procedures to accomplish this pretreatment are varied and are not a part of the invention. The unreacted gaseous products together with the used catalyst from this first synthesis zone are then passed to a second reaction zone in order to synthesize hydrocarbons of the motor fuel range. Reduction of carbon deposition on the catalyst and the selectivity of the processing for the formation of oxygenated organic compounds in the first reactor is improved by the presence of the water. The used catalyst from this first reactor is thus suitable for further use in the second stage of hydrocarbon synthesis.

Processing according to the invention usually involves 60 to 80% conversion of the hydrogen-carbon monoxide mixture. High yields of light oxygenated organic compounds are obtained from the water layer of the reaction product from the first stage of the processing. Thus, when processing with synthesis gas containing hydrogen and carbon monoxide in the ratio of 1.8 at a temperature from about 350° F. to about 600° F. preferably from about 450° F. to about 550° F., a pressure from about 200 to about 700 pounds per sq. inch preferably from about 450 to 550 pounds per sq. inch, a feed rate of between about 2 and about 30, and preferably between about 5 and about 20 cu. ft./lb. catalyst/hr., and a recycle of 1 to 2 relative to the initial feed gas, yields of the order of 40 to 75 cc. of light oxygenated organic compounds in the aqueous layer of the reaction product per cubic meter of mixture of hydrogen and carbon monoxide consumption are obtained, while in the corresponding oil layer, from 25% to 50% yield of alcohols of the $C_8$ to $C_{15}$ range are obtained.

The desired ratio of oxygenated products in the water and oil layers controls the operating conditions. In the oxygenated products about 70% of the combined oxygen is found in the oil layer when the temperature is about 450° F., to about 40% when the temperature is about 550° F. Thus, the temperature may be varied to give the optimum type of product.

The unreacted hydrogen and carbon monoxide from the oxygenated hydrocarbon synthesis unit is then passed to a hydrocarbon synthesis zone wherein the hydrogen and carbon monoxide are reacted to form hydrocarbons, predominantly above the C₃ range. In this second reaction zone, due to the high hydrogen content of the gas from the first reactor and the catalyst characteristics, the carbon deposition on the catalyst is low.

In the second reaction stage the processing conditions may be about the same as those employed in the first reaction stage. The temperature, however, commonly employed is between about 550° F. and about 750° F., and the pressure from 200 to 500 lbs. per square inch and the space velocity from 10 to 75 cubic feet of feed gases per lb. of catalyst per hour. Within these ranges of operating conditions, it is preferable to operate between about 625° F. and about 675° F., a pressure from about 350 to about 450 lbs. per square inch and at a space velocity of between about 15 and about 40 cubic feet of synthesis gas per lb. of catalyst per hour. These preferable temperature and pressure conditions are advantageous with the recycle ratio from about 2 to 5.

In the first stage of the process the use of temperatures in the lower portion of the operating range is advantageous for the production of the higher molecular weight oxygenated hydrocarbons. In the second stage of the process the higher the temperature, the lower the molecular weight and the more unsaturated are the reaction products. In general, the lower reaction temperatures in the first stage of the process are coupled with the higher temperatures in the second stage of the process. Similarly, a high reaction temperature in the first stage of the process is usually coupled with a temperature in the lower portion of the operating range in the second stage of the process. In both reaction stages a low temperature of operation is usually coupled with a low pressure operation and a high temperature of operation is coupled with a high pressure operation. By these interrelationships of the temperatures of the reactions in the two stages, high overall conversion of the feed stock occurs while the nature of the reaction products can thus be varied as desired.

In order that the invention may be more fully understood, the following description of a particular embodiment is presented. In the drawing, a flow diagram is presented of processing according to a particular embodiment.

Hydrogen and carbon monoxide in volume ratio of 1.8 are passed through line 9 into reaction unit 10. Water vapor in the amount of 4% by volume of the hydrogen and carbon monoxide mixture is passed from line 8 into line 9. The catalyst is passed into the reaction unit from storage vessel 5 through line 6. In general, the gravity of the fluidized mass admitted through line 6 is about 100–130 lbs. per cubic ft. The reaction unit 10 consists, in this particular embodiment, of a cylindrical portion 11 capped by a dome portion 12 and a conical base 13. Within the reaction vessel near the junction of the cylindrical portion 11 and the conical base 13 is a porous plate or grid 14. The unit 10 has a catalyst withdrawal line 15 and an overhead line 16 at the uppermost portion of the dome section 12. In the dome portion 12, one or more cyclone separating units as indicated by the reference numeral 17 are located. From the cyclone separator 17 is the dip pipe 18 for the returning of catalyst material from the cyclone.

In the reaction unit 10, the catalyst material is maintained in a highly fluidized condition as a result of the finely divided material of the catalyst and the upward passage of the gaseous materials from the base of the tower through the distributing grid 14. Within the unit 10, the fluidized mass presents a general appearance of a boiling liquid with a general level L at some point in the vessel some distance below the dome portion of the vessel. In this particular embodiment, the catalyst has a composition of 77% iron, 5% K₂O, less than 10% oxygen, the remainder being silica, alumina and other minor constituents. The reaction conditions within the unit include a temperature of between about 350–600° F., preferably between 450–550° F., a pressure of 450 p. s. i. g. and a recycle ratio of 1 to 2 of recycle to fresh feed gas. The recycle gas is passed into unit 10 through line 19. The particle size of the catalyst is in the range from 10 to 80 microns of which about 65% is between about 20 to 40 micron size, the remaining portion distributed in the range between 10 to 20 microns and to 80 microns. The superficial velocity of the gases passed upwards through the reaction unit 10 is usually 1.5 ft. per second and in this embodiment is maintained about 1 ft. per second. The space velocity is maintained between about 2 to about 30 and preferably about 10 cubic ft. of H₂ and CO fresh feed at standard conditions per lb. of catalyst per hour. Under these conditions, the catalyst height is about 5 to 20 feet.

Under the conditions of processing as specifically stated, a predominantly gaseous phase separation in the dome portion of the reaction unit passes through the cyclone separator 17 and thence through line 16 into treating equipment 20. Under the processing conditions in the unit 10 about 75–80% of the hydrogen-carbon monoxide mixture is converted to oxygenated hydrocarbons.

In the recovery unit 20, cooling of the products occurs. Also in the recovery unit 20, separation is effected between the gaseous and liquid phase products and also phase separation between the water soluble and the oil soluble products. The gaseous products are removed through line 21, the aqueous products through line 22 and the oil products through line 23. A portion of the gaseous product is recycled through line 19 to the reaction unit 10. The aqueous products removed through line 22 are removed from the system by further processing and separation of the desired constituents. Similarly, the oil soluble products removed through line 23 are removed from the system for the desired products. The remainder of the gaseous products are passed through line 24 into the reaction unit 30. Also additional supply of the feed H₂ and CO mixture may be added to this feed to the unit 30 through line 25. The catalyst removed from the unit 10 through line 15 also passes into the unit 30. Fluidizing gas may be injected into the line 15 as desired.

The unit 30 is similar in design to unit 10. It consists of a cylindrical section 31, a dome section 32 and a conical base section 33. Similarly near the junction of the cylindrical section 31 and conical base section 33 is the grid or vapor distributing plate 34. The unit is similarly equipped with a catalyst withdrawal line 35, an overhead line 36, a cyclone separating equipment 37 and a catalyst fines return line 38. Similarly, in the unit 30 a level P at a point some distance, usually about ⅔ of the height of the cylindrical portion is maintained.

In the unit 30, a temperature of 675° F., a pressure of 400 p. s. i. g., a superficial velocity of gases passed upwards of about 1 ft. per second, a space velocity between 10 and 30 and preferably 25 cubic ft. of gas per hour per lb. of catalyst. Under such conditions of processing, a substantially gaseous phase separation occurs in the top of the unit 30. This gas containing minor amounts of entrained catalyst particles passes through the cyclone separator 37 and thence through line 36 to treating equipment 40. In equipment 40, separation and purification of the desired products is effected and passed from the system through line 41. The gaseous products are removed from equipment 40 through line 42 and passed into line 24. The catalyst withdrawn through line 35 is passed to reactivating equipment as desired.

As an example of such processing from the reaction unit 10, 150–160 cc. of hydrocarbons heavier than propane and propylene and the low molecular weight alcohols were obtained in an amount of 40–50 cc. per cubic meter of hydrogen and carbon monoxide consumption. In the oil layer of the reaction product from vessel 10, 35% of product mainly alcohols in the $C_8$ to $C_{15}$ range were obtained. From the reaction unit 30, the following yield products are obtained per cubic meter of $H_2$ and CO consumed, 180 cc. of hydrocarbons heavier than propane and propylene and only 20 cc. of water soluble oxygenated compounds. The oxygenated hydrocarbon in the oil layer was 20% of these hydrocarbons. The composition of the water soluble oxygenated compounds were about 60% ethanol and normal proponal with traces of methanol, butanol and higher alcohols. Of the remaining 40%, about 20% was acetic and higher acids, 10% aldehydes and 10% ketones.

The overall conversion of $H_2$ and CO in the two reactors was above 93%. The selectivity of the reacted CO to carbon in reactor 10 was less than 0.2% while that in the second reactor 30 was less than 0.5%. Should this degree of $H_2$ and CO conversion be attempted in a single reactor with sufficiently severe operating conditions the yield of water soluble oxygenated compounds would be from 25 to 30 cc./m.³ of $H_2$ and CO consumed and the selectivity of CO to carbon would be above 0.5% which would have required a large replacement of catalyst to maintain the necessary catalyst size to give satisfactory fluidization in the reactor.

What is claimed is:

1. A process for preparing hydrocarbons and oxygenated hydrocarbons by the hydrogenation of carbon monoxide which comprises contacting in an initial synthesis reaction zone a gaseous mixture containing hydrogen and carbon monoxide in molecular proportion from about 1 to 2:1 and extraneous water vapor in the amount of about 2 to 8% by volume of the combined volume of hydrogen and carbon monoxide with a fluidized iron-type catalyst promoted with about 1 to 8% by weight of an alkali metal compound promoter at a temperature of from about 350° to about 600° F., a pressure of from about 550 to 700 p. s. i., a space velocity from 2 to 30 cubic feet of gaseous mixture per hour per pound of catalyst, a ratio of recycle to fresh feed gas of 1 to 2 volumes recycle per volume of fresh feed, removing the reaction products, treating the vaporous reaction products to separate gaseous and liquid products including hydrocarbons and oxygenated hydrocarbons, contacting the unconverted gases in a second reaction zone with a portion of previously used catalyst, contacting said unconverted gases at a temperature of from 550° to 750° F., a pressure from 200 to 500 p. s. i. and a space velocity of 10 to 75 cubic feet of gas per hour per pound of catalyst, and recovering the hydrocarbons thus formed.

2. The process according to claim 1 in which the extraneous water vapor is present in the amount of 3 to 5% by volume of said combined volume of hydrogen and carbon monoxide.

3. A process for preparing hydrocarbons and oxygenated hydrocarbons by the hydrogenation of carbon monoxide which comprises contacting a gaseous mixture containing hydrogen and carbon monoxide in the molecular ratio of about 1.8 and extraneous water vapor in the amount of about 4% by volume of said combined mixture of $H_2$ and CO, with a finely divided catalyst containing about 77% iron and 5% $K_2O$ and containing about 1 to 3% carbon as carbide at a temperature of about 450° to 550° F. and a pressure of 450 p. s. i. and a space velocity of about 10 cubic feet of gaseous mixture per hour per pound of catalyst in a fluidizing reaction zone, maintaining a recycle ratio of 1 to 2 volumes of recycle gas per volume of fresh feed, maintaining an $H_2$+CO conversion level of less than about 75% in said zone, removing the reaction products and a portion of the used catalyst, treating the vaporous reaction products to separate gaseous and liquid reaction products including hydrocarbons and oxygenated hydrocarbons, contacting the unreacted synthesis gas with a portion of said used catalyst at a temperature of about 675° F., a pressure of about 400 p. s. i. and a space velocity of about 25 cubic feet of gas per hour per pound of catalyst and recovering the hydrocarbons thus formed.

CHARLES E. HEMMINGER.

REFERENCES CITED

The following references are of record in the file of this patent:

UNITED STATES PATENTS

| Number | Name | Date |
|---|---|---|
| 1,801,382 | Wietzel | Apr. 21, 1931 |
| 2,231,990 | Dreyfus | Feb. 18, 1941 |
| 2,234,941 | Keith, Jr. | Mar. 11, 1941 |
| 2,257,293 | Dreyfus | Sept. 30, 1941 |
| 2,279,052 | Michael | Apr. 7, 1942 |
| 2,309,034 | Barr | Jan. 4, 1944 |
| 2,347,682 | Gunness | May 2, 1944 |
| 2,416,730 | Arveson | Mar. 4, 1947 |
| 2,417,164 | Huber, Jr. | Mar. 11, 1947 |
| 2,425,555 | Nelson | Aug. 12, 1947 |
| 2,451,879 | Scharmann | Oct. 19, 1948 |
| 2,461,064 | Kemp, Jr. | Feb. 8, 1949 |
| 2,472,219 | Lyons | June 7, 1949 |